United States Patent

Remde et al.

[11] 3,872,752
[45] Mar. 25, 1975

[54] SNACK CUTTER

[75] Inventors: Richard H. Remde, Minneapolis; Stanley G. Liedman, Anoka, both of Minn.

[73] Assignee: General Mills, Inc., Minneapolis, Minn.

[22] Filed: Apr. 27, 1973

[21] Appl. No.: 355,233

[52] U.S. Cl. ............ 83/100, 83/121, 83/152, 83/434, 83/669, 83/684, 83/346
[51] Int. Cl. ......... B26d 7/06, B26d 1/56, B26f 1/08
[58] Field of Search ............ 83/100, 121, 152, 434, 83/675, 669, 346, 348, 684, 685

[56] References Cited
UNITED STATES PATENTS

| 761,792 | 6/1904 | Such et al. | 83/346 X |
| 2,445,831 | 7/1948 | Hoffman et al. | 83/100 |
| 2,530,319 | 11/1950 | Young | 83/434 X |
| 2,938,474 | 5/1960 | Filler | 83/434 X |
| 3,338,124 | 8/1967 | Palle, Sr. | 83/152 |
| 3,430,542 | 3/1969 | Sarka | 83/100 X |
| 3,611,855 | 10/1971 | Thousand, Jr. | 83/100 |

FOREIGN PATENTS OR APPLICATIONS

| 45-30042 | 3/1970 | Japan | 83/100 |

Primary Examiner—Willie G. Abercrombie
Attorney, Agent, or Firm—Anthony A. Juettner; Gene O. Enockson; Norman P. Friederichs

[57] ABSTRACT

Apparatus is disclosed for cutting a continuous dough ribbon suitable for frying to produce a chip snack. The ribbon is cut between a pair of rolls.

8 Claims, 11 Drawing Figures

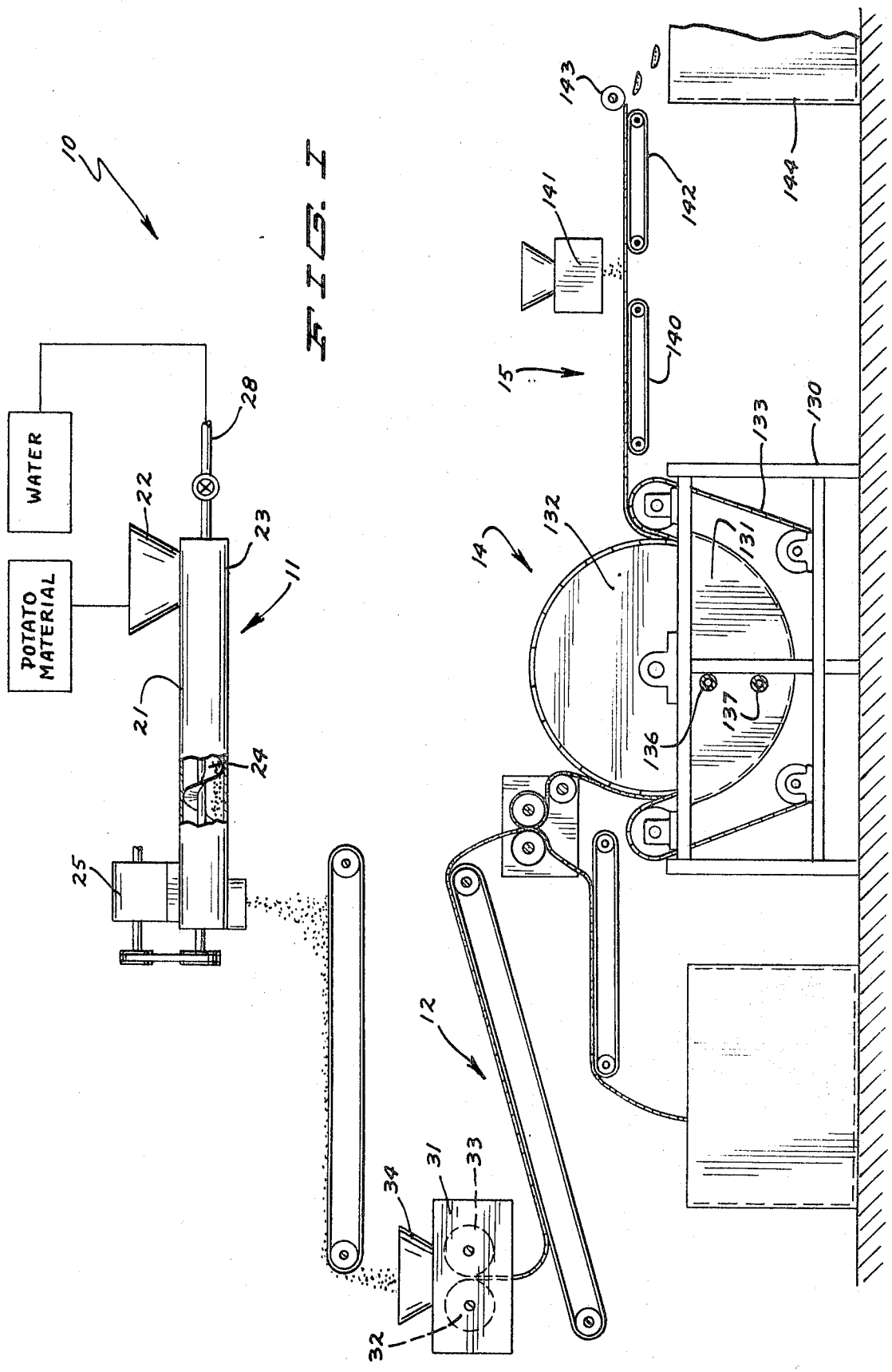

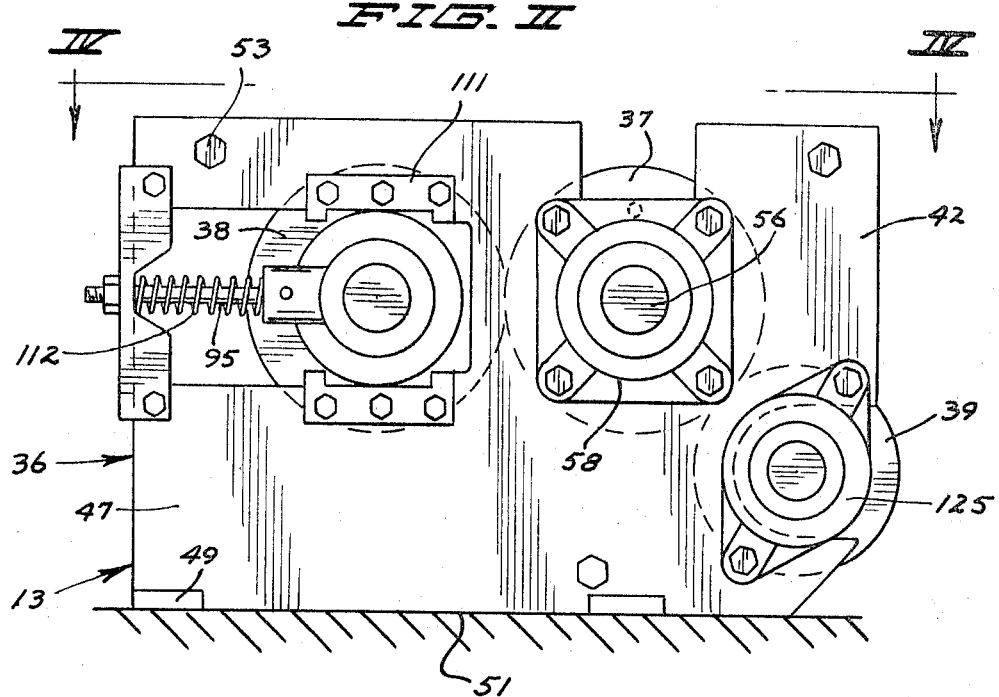
FIG. II
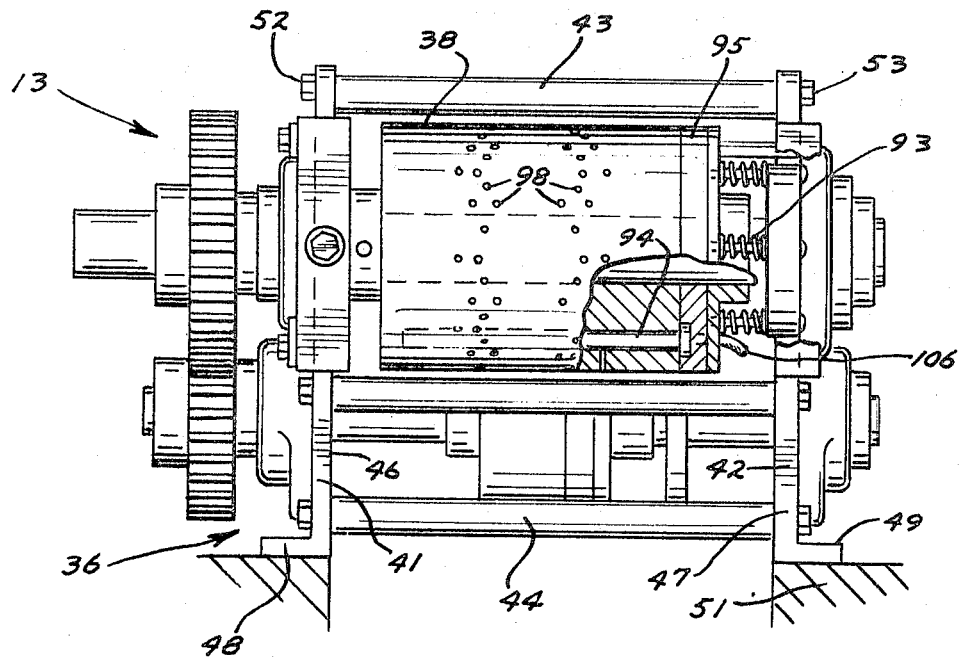
FIG. III

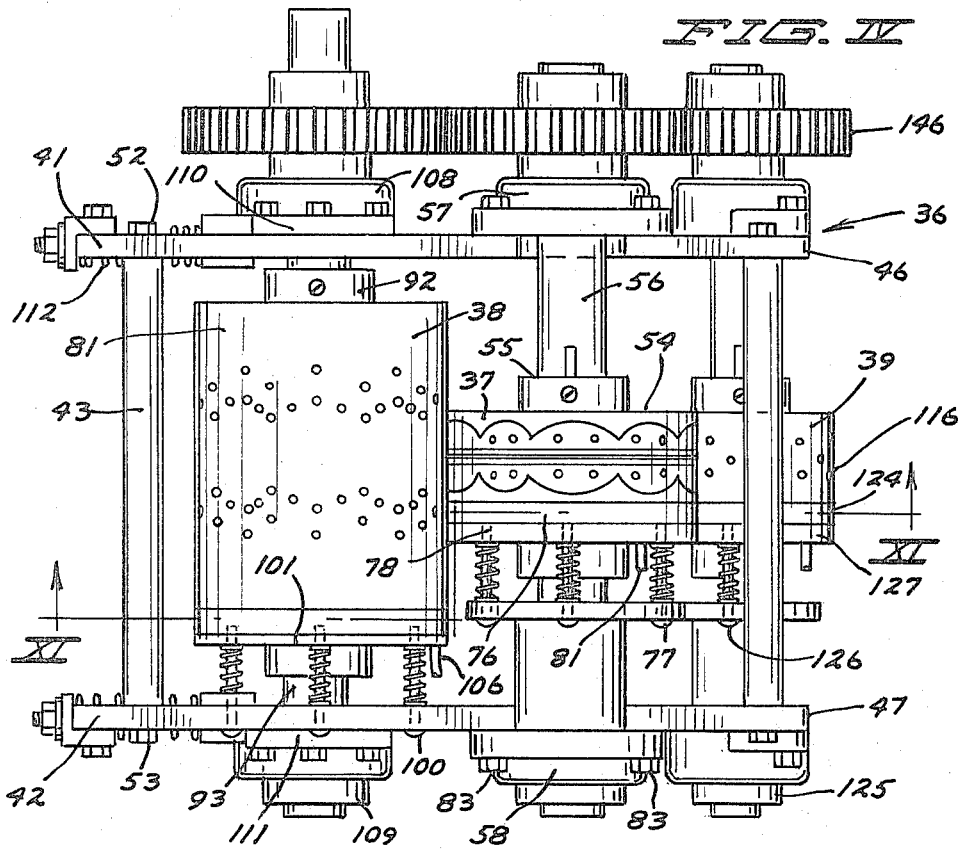
FIG. V
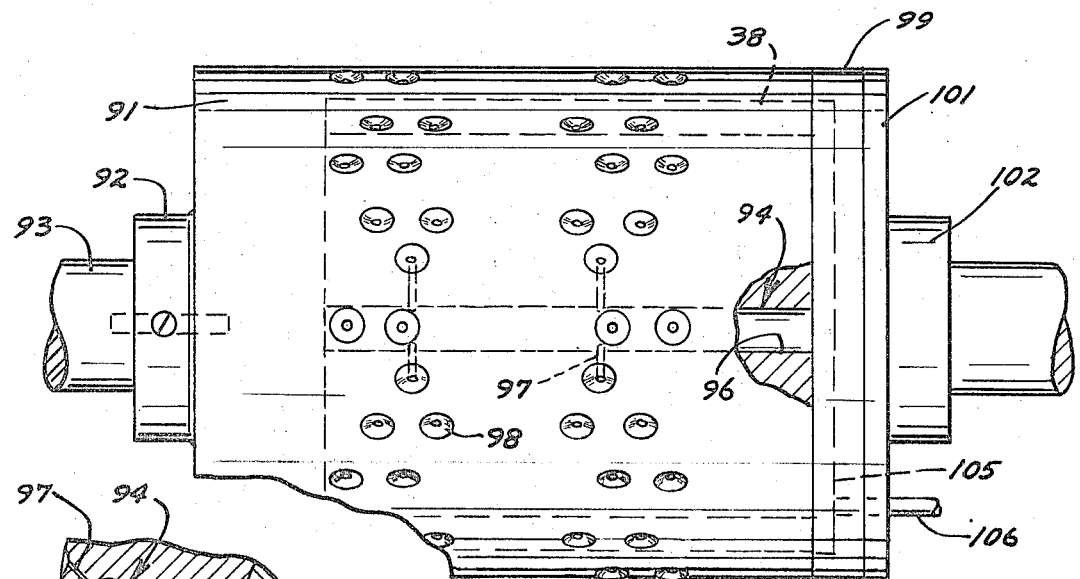
FIG. VII
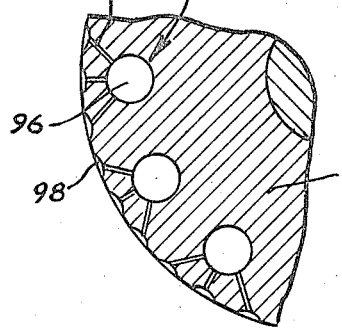
FIG. VIII

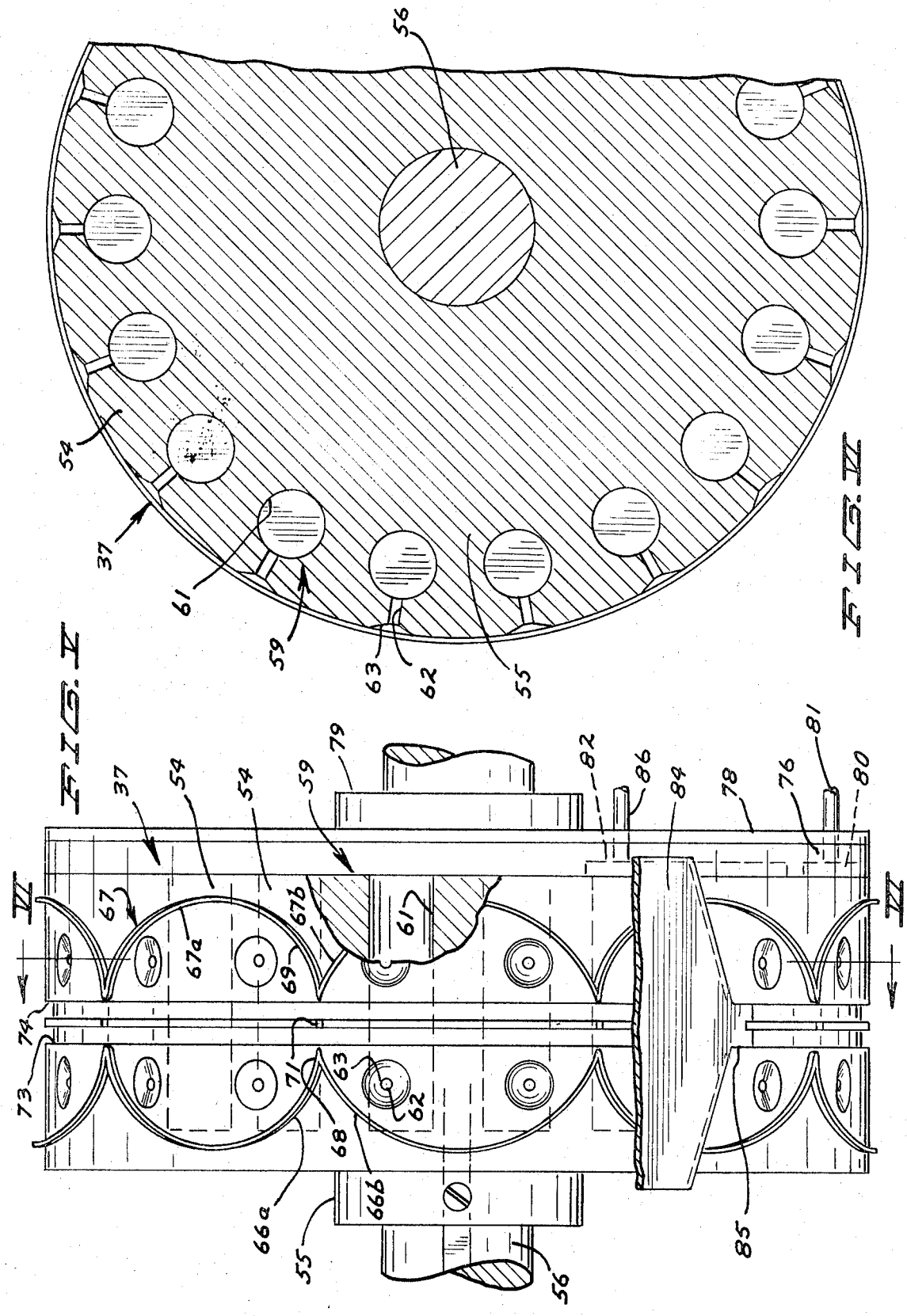

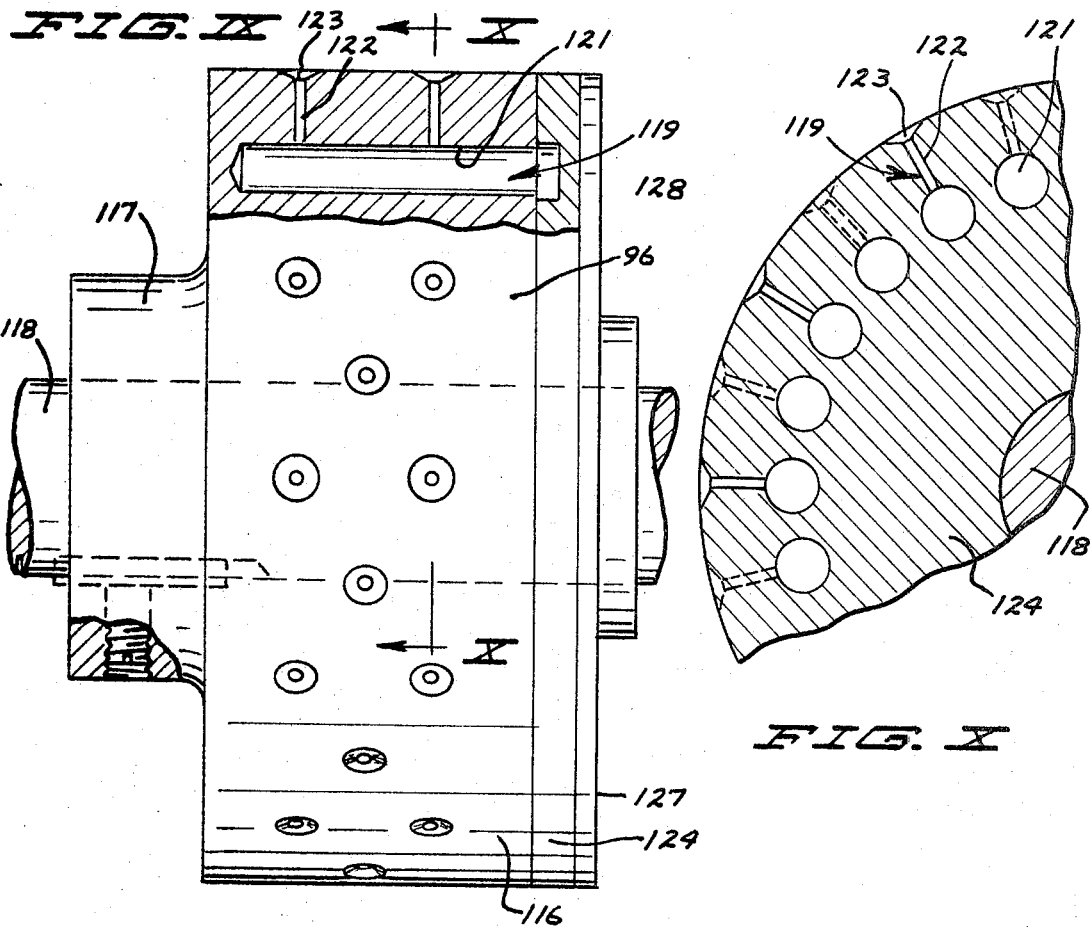
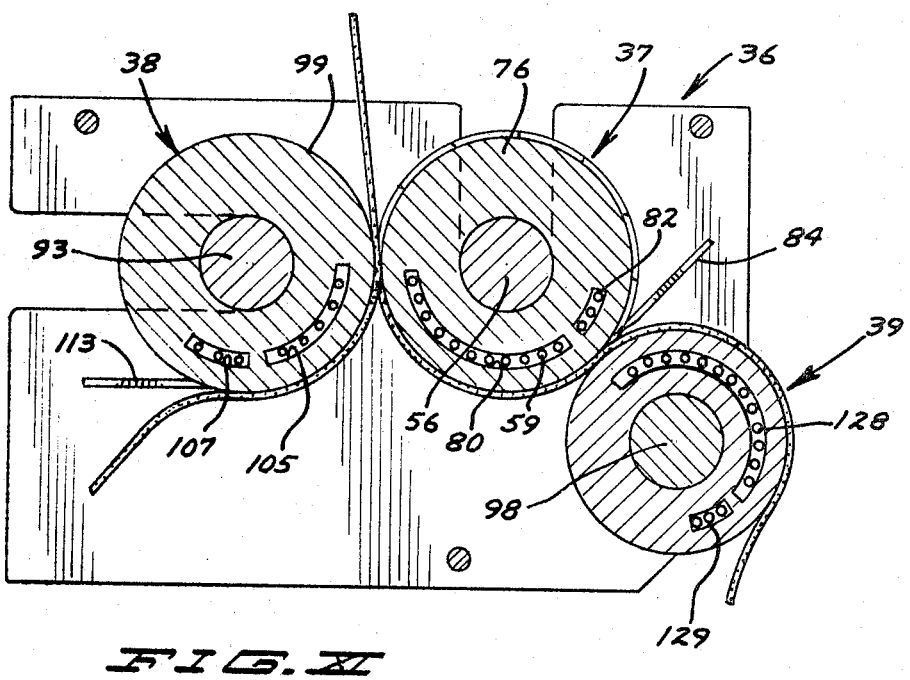

SNACK CUTTER

BACKGROUND OF THE INVENTION

The present invention relates to snack products and more particularly to chip-type snack products.

The food products which are sold in the general category of snack items are many and varied, typically including such things as chips (e.g., potato chips and corn chips), puffs (e.g., corn puffs), etc. Snack items account for a large volume in the food industry. Generally, snack items are eaten apart from a regular meal and often different snack items are served at the same time. When snacks are served, normally at least one chip-type snack is included. One of the most popular chip-type snacks is the potato chip or fabricated potato chip.

The present invention relates to apparatus for preparing fabricated chip-type snacks. The present invention will be described primarily with regard to preparation of potato chips; however, it should be recognized that various other types of fabricated chips (such as corn chips or wheat chips) may be prepared using the present invention.

It has been known in the past to prepare chip-type snacks by preparing a dough sheet and cutting sections from the dough sheet. The sections are then fried to form chips. A major difficulty has been confronted in controlling the movement of the sections through the deep fat fryer. A partial solution has been provided by operating a continuous belt in the upper portion of the fryer which assists in moving the sections through the fryer. Some sections, however, may clump together resulting in unfried or only partially fried chips. Other sections may remain in the fryer too long and become overly fried or burned. It was recently discovered that such problems may be overcome by frying a continuous ribbon of chips which is moved positively through the system. The present invention provides apparatus for cutting a ribbon of interconnected unfried chips from a sheet of dough.

The dough may be prepared from any of various particulate starchy food materials such as potato granules, potato flakes, wheat flour, rice flour, corn grits and the like. The dough, when preparing fabricated potato chips, may be prepared from a 1:1 mixture of potato flakes and potato granules. The dough may be prepared solely from either potato flakes or potato granules or any mixture thereof. Alternatively, the dough may be prepared from any other potato material or other farinaceous material. The dough may have various other added ingredients. The total moisture content is such that the dough has satisfactory handling characteristics. In other words, the dough has sufficient cohesiveness to stick together as a sheet but not so much adhesiveness that it sticks excessively to equipment. Water is added to the starchy food material in an amount sufficient to form the dough. The total moisture content of the dough may vary somewhat depending on the particular starchy food material being used but will preferably be in the range of 25 to 45 percent. The term "percent" and the like, as used herein, will mean by weight unless otherwise indicated. The most preferred moisture level is about 40 percent.

The dough may be sheeted to any suitable thickness. The thickness typically may be about 0.025 inch; however, the preferred thickness may be in the range of 0.010 inch. A more preferred dough sheet thickness is about 0.015 to 0.06 inch. The dough sheet may be cut into any desired shape of connected dough pieces (i.e., unfried chips) such as round or oval. The present invention provides apparatus for cutting such ribbon of connected dough pieces. The pieces remain connected by a narrow portion which is large enough to permit processing of the ribbon of connected dough pieces through the fryer without separation or breakage of the ribbon. The connecting portion may be small enough to permit easy separation of the chips after removal from the fryer. The connecting portion for chips having a 1 to 2 inch diameter may typically be ⅛ to ½ inch. However, the connecting portion may be wider, if desired.

The ribbon may be transported through a bath of hot oil to fry the ribbon using any desired type of fryer. The moisture content during frying is reduced, for example, to less than 5 percent. Any type of frying oil may be used such as cottonseed oil, coconut oil, peanut oil and the like. The temperature of the frying oil is sufficient to fry the dough sheet to form fried chips but not so high as to burn the oil (i.e., below the smoke point of the oil). During frying, the dough is puffed or expanded and flavor is developed. The dough typically will expand about 100% in thickness during frying. In other words, the final thickness of the puffed chip may be about twice that of the unpuffed dough. The amount of expansion may be increased or decreased, if desired, such as by confining the dough. The frying oil may be at a temperature of about 250° to 410°F., preferably about 320° to 380°F., typically 350°F. The frying time will generally be about 5 to 30 seconds, preferably 8 to 20 seconds.

The ribbon may be removed from the frying oil and separated into individual chips. The fried chips may be separated by any desired method, for example, by cutting them apart with a knife. The ribbon may be permitted to become brittle or friable after removal from the fryer. In other words, the fried ribbon is pliable immediately upon leaving the fryer and becomes brittle or friable after about 5 to 10 seconds. Although the exact mechanism is not fully known, it is believed that the change from the pliable state to the friable state is a result of two factors, namely, cooling and dehydration. The change appears to be irreversible in the absence of the addition of major amount of water. The friable chips are then separated such as by applying a moment force perpendicular to the ribbon (i.e., bending the ribbon) causing a fracture across the connecting portion.

APPARATUS OF THE PRESENT INVENTION

Apparatus suitable for carrying out the present invention is shown in the drawings.

IN THE DRAWINGS:

FIG. 1 shows a schematic view of apparatus including the present invention;

FIG. II shows a side view of the present cutter;

FIG. III shows an end view of the cutter;

FIG. IV shows a top view of the cutter;

FIG. V shows a side view of the cutting roll;

FIG. VI shows a cross sectional view of the cutting roll taken along the line VI—VI in FIG. V;

FIG. VII shows a side view of the smooth roll;

FIG. VIII shows a sectional view of a portion of the smooth roll;

FIG. IX shows a side view of the transfer roll with portions broken away;

FIG. X shows a sectional view of a portion of the transfer roll taken along the line X—X in FIG. IX;

FIG. XI shows cross sectional view taken along the line XI—XI in FIG. IV.

Apparatus 10 (FIG. I) in which the present invention may be utilized may include a mixing section 11, a sheeting section 12, the present cutting apparatus 13, a frying section 14 and a finishing section 15.

The mixing section 11 may include any type of apparatus suitable for the preparation of a dough such as from dehydrated potato material, typically potato granules, and water. The mixing section 11 may be a continuous auger mixer 21 or alternatively a paddle mixer. The auger mixer 21 may include a hopper 22, a barrel 23, a cut flight screw auger 24 and a motor 25. The screw auger 24 may be suitably supported at each end by bearings. The screw auger is rotatably driven by the electric motor 25. The potato material may be added to the hopper 22 and is gradually pulled down into the barrel 23 by the screw auger 24. A water line 28 supplies the desired amount of water to the mixer 21. The auger 24 intimately mixes the potato material and the water to form the dough. The water is present in an amount sufficient to form a dough that will stick together or, in other words, remain cohesively fused. Preferably, the water is not present in an amount so great as to make the dough adhesive and create sticking problems during processing. The water typically may be present in an amount of from about 25 to 45 percent, preferably about 40 percent by weight, based on the total weight of the dough. The added moisture is permitted to equilibrate throughout the dough, for example, by providing a residence time for the dough in the mixer of up to about 5 to 10 minutes.

The dough may be sheeted using any desired sheeting apparatus such as the sheeting section 12 which may include a support frame 31, a pair of smooth rolls 32, 33 and a hopper 34. The rolls 32 and 33 may be metal rolls which are rotatably driven by a motor. The rolls 32 and 33 are spaced to provide the desired thickness of dough sheet. In the preparation of fabricated potato chips, the thickness of the dough sheet may be about 0.02 to 0.03 inch.

The apparatus 13 for cutting the ribbon of dough, which comprises the present invention is shown in FIGS. II–IV. The cutting apparatus 13 includes a support frame 36, a cutting roll 37, a smooth roll 38 and a transfer roll 39. The support frame 36 may include a pair of side walls 41 and 42 which are held together by a plurality of cross members such as 43 and 44. The side walls 41 and 42 may be constructed of plate metal. The side walls 41 and 42 each may include a vertical portion 46, 47 and a support flange 48, 49, respectively. The support flanges 48 and 49 may be secured to a table 51 such as by bolts. The cross members 43 and 44 may be rods having threaded openings therein for reception of screws such as 52 and 53.

The cutting roll 37 may include a drum 54 (FIGS. V and VI) with a hub 55. The hub 55 is locked to a shaft 56 by a key. The shaft is rotatably supported in a pair of bearing assemblies 57 and 58 (FIG. IV). The drum 54 has a plurality of passageways 59 spaced circumferentially therearound. The passageway 59 includes a first zone 61 which is parallel with the axis of the drum 54. The zone 61 may be open at one end and closed at the other end. For example, zone 61 may extend only part way through the drum 54 as shown in FIG. V. The passageway 59 further includes a zone 62 which extends perpendicular to zone 61. In other words, zone 62 extends radially outwardly from zone 61. Zone 62 may include an enlarged portion 63 at the outer end thereof.

The drum 54 has a pair of ridges 66 and 67, which may be provided by machining away other portions of the drum surface. The ridges 66 and 67 each follow a particular configuration and cooperate to produce a ribbon of interconnected chips when in use. Ridge 66 may consist of a series of connected arcs 66a and 66b. Ridge 67 likewise may consist of a series of connected arcs 67a and 67b. The connecting points 68 of ridge 66 are spaced from the connecting points 69 of the ridge 67, for example, ⅜ inch. In the preferred embodiment, a ridge projection 71 is provided intermediate the points 68 and 69. The drum 54 also preferably includes a pair of circumferential channels 73 and 74. The cutter roll 37 (FIGS. IV and V) further includes a vacuum mainifold 76 which may be made from machinable, low friction, sealable material. To be sealable the material should be capable of taking a good surface finish and yet be resistant to wear. One satisfactory material is a molybdenum disulfide filled nylon such as that sold under the trademark Nylatron. A pressure plate 78 forces manifold 76 into engagement with drum 54 with sufficient force to provide a substantial seal therebetween. The manifold 76 and pressure plate 78 are locked with respect to the frame 36 such as by pins 77.

In other words, the manifold 76 and pressure plate 78 are stationary and the shaft 56 rotates with respect to the manifold 76 and pressure plate 78. The pressure plate 78 may include a hub 79 which assists in maintaining the manifold 76 and pressure plate 78 coaxially aligned with the shaft 56. The manifold 76 may be secured to the pressure plate 78 such as by bolts or screws. The manifold 76 may be formed from a flat disc of the Nylatron material and includes a channel 80 cut therein, see FIGS. V and XI, which is open toward the drum 54. The channel 80 is located for communication with a limited number of the passageways 59 as shown in FIG. XI. A vacuum supply line 81 communicates with the channel 80. The manifold 76 may include a second channel 82 which is located for communication with a limited number of the passageways 59. An air pressure line may communicate with the channel 82. The bearing assemblies 57 and 58 support shaft 56 and thus the drum 54 in frame 36. The bearing assemblies 57 and 58 may be secured to side walls 41 and 42 such as by screws 83. A scraper 84 may be provided for assisting in removing the ribbon from the roll 37. The scraper may have a projection 85 which fits into the grooves 73 and 74.

The smooth roll 38 (FIGS. VII and VIII) may be constructed somewhat similar to the cutting roll 37. Roll 38 includes a drum 91 having a hub 92 which is supported on a shaft 93. The roll 38 is locked to the rotatable shaft 93 such as by a key. The drum 91 has a plurality of passageways 94 defined therein spaced circumferentially around the drum 91. The passageways 94 have a first zone 96 which extends parallel with the axis of the drum 91. The zone 96 may be open at one end and closed at the other end. The passageway 94 further includes one or more zones 97 which extend perpendicular to zones 96. In other words, zone 97 extends radially outwardly from zone 96 to the surface of the roll 38. Zone 97 may include an enlarged portion 98 at the outer end thereof. The roll 38 further includes a vacuum manifold 99. A pressure plate 101 urges manifold 99 into engagement with drums 91 with sufficient force to provide a substantial seal therebetween. The manifold 99 is locked with respect to the frame 36 as by pins 100, i.e., manifold 99 and pressure plate 101 are stationary and do not rotate. The pressure plate 101 may include a hub 102 which assists in maintaining the manifold 99 and pressure plate 101 coaxially aligned with the shaft 93. The manifold 99 may be secured to the pressure plate 101 by bolts or screws. The manifold 99 may be made from the same type of material as manifold 76. The manifold 99 includes a channel 105 which communicates with passageways 94 and vacuum supply line 106. The manifold 99 may include a second channel 107 which communicates with passageways 94 and an air supply line. The shaft 93 of roll 38 is rotatably supported in a pair of bearing assemblies 108 and 109 which are secured to side walls 41 and 42. The bearing assemblies 108 and 109 (FIG. II) are each preferably slidably mounted in a pair of tracks such as 110 and 111. A pair of springs 112 may force the smooth roll 38 against the cutting roll 37. A scraper 113 may be provided to assist in removing the waste portion from the roll 38.

The transfer roll 39 is constructed similar to smooth roll 38. The roll 39 includes a drum 116 having a hub 117 which supports drum 116 on the shaft 118. The drum 116 has a plurality of passageways 119 defined therein spaced circumferentially around the drum 116. The passageways 119 have a first zone 121 which extends parallel with the axis of the drum 116. The zone 121 is open at one end and closed at the other end. The passageway 119 further includes one or more zones 122 which extend perpendicular to the zone 121. In other words, zone 122 extends radially outwardly from the zone 121 to the surface of the roll 39. The zone 122 may include an enlarged portion 123 at the outer end thereof. The roll 38 further includes a vacuum manifold 124 which may be constructed of the same material as manifold 76. The manifold 124 is locked with respect to the frame 36 as by pins 126. A pressure plate 127 urges manifold 124 into engagement with drum 116. The plate 127 has a hub through which the shaft 118 rotatably extends. The hub maintains the manifold 124 and the plate 127 coaxially aligned with the drum 116. The manifold 124 includes a vacuum channel 128 and an air pressure channel 129. The shaft 118 is supported in bearings 125.

The fryer section 14 may be a fryer substantially like that described and claimed in Pat. application, Ser. No. 355,259, entitled SNACK FRYER filed on even date herewith, which description is incorporated herein by reference. Alternatively, the fryer may be of any type through which the ribbon may be passed during frying. The fryer section 14 (FIG. I) may include a support frame 130, a frying tank 131, a conveying wheel 132 and a continuous conveying chain system 133. The support frame 130 may be constructed from any structural material such as tubing, angle iron stock and the like, for example, by welding. The frying tank 131 may be constructed from sheet metal and is secured in frame 130 such as by bolts (not shown).

The tank 131 has an oil inlet pipe 136 for receiving heated oil from any suitable external heater (not shown). The tank 131 has an oil outlet pipe 137 for returning such oil to the heater. Any conventional frying oil heater may be used. Such heaters are typically of two types, direct external heaters and indirect external heaters. The direct external heater applies heat, such as by a gas flame, directly to a conduit through which the oil is passing. The indirect external heater applies heat to a conduit through which a heat transfer fluid such as steam is passing. The heat transfer fluid and the cooking oil are both passed through a heat exchanger in separate conduits and the cooking oil picks up heat energy from the heat transfer fluid. The indirect external heater is preferred in the present invention since more uniform heat is applied to the cooking oil resulting in less degradation of the oil. The heaters in either case may be of a gas fired type or of an electrical resistance type.

Conveying wheel 132 and conveying chain system 133 provide a pair of frying surfaces between which the ribbon is held as it is carried through the frying tank. The frying surfaces may be spaced apart typically 0.03 to 0.07 inch when frying a dough piece having a thickness of 0.02 inch. The frying surfaces may be spaced apart typically 0.08 to 0.10 inch when frying a dough piece having a thickness of 0.05 inch.

The finishing section 15 (FIG. I) may include a first conveyor 140, a salter 141, a second conveyor 142 and a chip separator 143. The conveyors 140 and 142 may be conventional continuous belt conveyors; however, they may be provided with a plate for supporting the upper reach of the respective belt. In the case of a shaped chip, the belt conveyors may conform to the shape of the chips. The salter 141 may be of any design suitable for metering out the desired amount of salt or other flavoring onto the row of chips. The chip separator 143 may be a wheel that impinges against the individual chips thereby resulting in a fracture across the narrow portion connecting the chips. Such a chip separator is shown and claimed in Pat. application, Ser. No. 355,231. The chips then fall into a container 124.

Although operation of the apparatus is apparent from the description of the apparatus, such operation will be further described. The farinaceous material and water are mixed in the screw mixer 21 (FIG. I) to form a dough which is then sheeted between the rolls 32 and 33. The continuous sheet is fed to the cutter 13 and passes between the cutter roll 37 (FIGS. II-XI) and the smooth roll 38. The smooth roll 38 is urged against the cutter roll 37 by the springs 112. The rolls 37 and 38 are rotatably driven such as by an electric motor (not shown) to move the dough sheet therebetween. The rolls 37 and 38 as well as the transfer roll 39 are synchronized such as by a set of gears 146. In other words, the rolls 37 and 38 are coordinated by the gears 146 such that the ridges 66, 67 and the vacuum passageways 59 align with passageways 94 to handle the ribbon and waste. As the dough sheet is drawn between rolls 37 and 38, the ridges 66 and 67 cut through the sheet to provide a continuous ribbon of interconnected dough pieces. The ridge projection 71 provides a perforation in the connecting portion of the ribbon. The perforation provides a weakened line across the connecting portion and thus aids in providing a smooth break of the ribbon following frying of the ribbon.

The dough sheet is gripped by application of a vacuum by certain portions of the rolls 37 and 38 (see FIGS. III and XI). In other words, a vacuum is applied to the zone 105 of the vacuum manifold 99 of roll 38, such as by vacuum line 106. As the roll 38 rotates the vacuum passageways 94 sequentially engage the zone 105. A vacuum is continuously applied to the zone 105 by the vacuum line 106. The vacuum in turn is applied to each of the passageways 94 as they sequentially engage the zone 106. The pattern of passageways 94 (FIG. VII) on roll 38 is such that the roll 38 vacuum grips only the waste portion of the dough sheet.

A vacuum is also applied to the zone 80 of manifold 76 of cutting roll 37 such as by vacuum line 81. As cutter roll 37 rotates the vacuum passageways 59 sequentially engage the manifold zone 80. A vacuum is continuously applied by the vacuum line 81 to the manifold zone 80. The vacuum in turn is applied to the passageways 59 as they sequentially engage the zone 80. The pattern of passageways 59 on cutter roll 37 is such that the roll 37 vacuum grips only the ribbon. As the rolls 37 and 38 continue to rotate the vacuum grip pulls the cut ribbon and the waste portion apart. The manifolds 76 and 99 each further include a vacuum release channel or zone 82 and 107 respectively for releasing the vacuum from the passageways 59 and 94 thereby releasing the grip on the ribbon and the waste portion. The release zones 76 and 107 may be merely open to the atmosphere thereby relieving the vacuum. Alternatively, a positive pressure from an air compresser may be applied to the zones 76 and 107 to relieve the vacuum. In addition, the cutter roll 37 may be provided with a scraper 84 for assisting in removing the ribbon from the roll 37. The scraper has a projection 85 which fits into the grooves 73 and 74 thereby reaching beneath the ribbon and gently and evenly lifting the ribbon. The roll 38 may also include a scraper 113 for assisting in removing the waste portion from the roll 38. The scraper 113 may be a flat scraper that extends across the face of the roll 38.

The ribbon is next passed to the transfer roll 39 and is gripped by vacuum. In other words, a vacuum is applied to zone 128 of manifold 124. As the roll 39 rotates, the passageways 119 sequentially engage the zone 128 and vacuum is applied through passageways 119 to the ribbon. The vacuum in passageways 119 is then relieved by zone 129 which may be open to the atmosphere or pressurized by a compressor.

The cut ribbon is passed through the fryer, then salted and separated into individual chips.

Various modifications may be made without departing from the scope of the present invention. For example, the rolls 37, 38 and 39 may be modified to simultaneously cut two or more ribbons. The cutting roll 37 would be provided with two or more sets of cutting ridges 66 and 67. The location of the various vacuum passageways such as 94 and 119 on rolls 38 and 39 would be modified to handle the various dough ribbons and waste portions. Also, manifolds may be provided at both ends of the various rolls 37, 38 and 39. In this case the zones 61, 96 and 121 would extend completely through the rolls 37, 38 and 39, respectively. A plurality of projections 71 may be provided for each of the ribbon connecting portions. Various other modifications would be apparent to one skilled in the art.

The embodiments of the invention in which an exclusive property or privilege is claimed are defined as follows:

1. Apparatus for cutting a continuous ribbon of shaped dough suitable for frying to form a chip type snack, said apparatus comprising:
   first roll means including a pair of spaced continuous cutting ridges extending around said roll means, said cutting ridges each comprising a series of connected arcs, the connection of said arcs of the first ridge being opposite the connection of said arcs of the second ridge, the connections of said first and second ridges being pointed toward each other;
   second roll means disposed adjacent said first roll means, said cutting ridges impinging against said second roll means; means for rotatably driving said first and second roll means whereby a continuous sheet of dough may be moved between said rotating roll means to cut said dough sheet into a continuous shaped ribbon and waste sheet.

2. The apparatus of claim 1 wherein first vacuum means are associated with one of said roll means to grip said cut ribbon and hold said ribbon to said roll means and second vacuum means associated with the other of said roll means to grip the waste sheet, said ribbon and said waste sheet being held by said vacuum means and said ribbon is pulled from said waste sheet.

3. The apparatus of claim 2 wherein said cut ribbon is vacuum held to said first roll means and said waste sheet is vacuum held to said second roll means.

4. The apparatus of claim 1 wherein said first roll includes a circumferential channel means extending into said first roll and wherein said apparatus further includes a lifting means having projection means extending into said channel means and beneath the surface of the first roll thereby reaching beneath said ribbon to lift said ribbon from said roll.

5. Apparatus for cutting a continuous ribbon of shaped dough suitable for frying to form a chip type snack, said apparatus comprising:
   first roll means including a pair of spaced continuous cutting ridges extending around said roll means, each of said cutting ridges comprising a series of connected arcs, the connection of said arcs of the first ridge being opposite the connection of said arcs of the second ridge, said connections being pointed toward each other, said first roll means further including a ridge projection located between said connections;
   second roll means disposed adjacent said first roll means, said cutting ridges inpinging against second roll means; and
   means for rotatably driving said first and second roll means whereby a continuous sheet of dough may be moved between said rotating roll means to cut said dough sheet into a continuous shaped ribbon and waste sheet.

6. The apparatus of claim 2 wherein said apparatus further includes transfer roll means for receiving said cut ribbon from said one roll means and vacuum means associated with said transfer roll means to pull said ribbon from said one roll means.

7. The apparatus of claim 6 wherein said first roll means, second roll means and transfer roll means include synchronizing gears.

8. The apparatus of claim 7 including compressed air means for relieving each of said vacuum means.

* * * * *